(12) United States Patent
Mondal et al.

(10) Patent No.: US 12,479,994 B2
(45) Date of Patent: Nov. 25, 2025

(54) CURABLE SILICONE-BASED COMPOSITIONS AND APPLICATIONS THEREOF

(71) Applicant: Momentive Performance Materials Inc., Waterford, NY (US)

(72) Inventors: Titash Mondal, Bengal (IN); Murali Mg, Karnataka (IN); Shreedhar Bhat, Bangalore (IN); Haigang Kang, Shanghai (CN)

(73) Assignee: Momentive Performance Materials Inc., Waterford, NY (US)

( * ) Notice: Subject to any disclaimer, the term of this patent is extended or adjusted under 35 U.S.C. 154(b) by 822 days.

(21) Appl. No.: 17/417,441

(22) PCT Filed: Dec. 18, 2019

(86) PCT No.: PCT/US2019/067021
§ 371 (c)(1),
(2) Date: Jun. 23, 2021

(87) PCT Pub. No.: WO2020/139642
PCT Pub. Date: Jul. 2, 2020

(65) Prior Publication Data
US 2022/0073746 A1    Mar. 10, 2022

(51) Int. Cl.
| | | |
|---|---|---|
| *C08L 83/04* | (2006.01) | |
| *C08G 18/10* | (2006.01) | |
| *C08G 18/24* | (2006.01) | |
| *C08G 18/28* | (2006.01) | |
| *C08G 18/32* | (2006.01) | |
| *C08G 18/38* | (2006.01) | |
| *C08G 18/50* | (2006.01) | |
| *C08G 18/61* | (2006.01) | |
| *C08G 18/71* | (2006.01) | |
| *C08G 77/08* | (2006.01) | |

(Continued)

(52) U.S. Cl.
CPC .............. *C08L 83/04* (2013.01); *C08G 18/10* (2013.01); *C08G 18/24* (2013.01); *C08G 18/2885* (2013.01); *C08G 18/3206* (2013.01); *C08G 18/3893* (2013.01); *C08G 18/5015* (2013.01); *C08G 18/61* (2013.01); *C08G 18/718* (2013.01); *C08G 77/08* (2013.01); *C08G 77/16* (2013.01); *C08G 77/24* (2013.01); *C08G 77/26* (2013.01); *C08K 3/013* (2018.01); *C08K 3/041* (2017.05); *C08K 3/08* (2013.01); *C08K 5/57* (2013.01); *C08K 9/02* (2013.01); *C08L 75/04* (2013.01); *C08L 75/08* (2013.01); *C08L 83/08* (2013.01); *C08L 83/10* (2013.01); *C08L 83/14* (2013.01); *C09D 183/14* (2013.01); *C08G 65/336* (2013.01); *C08G 77/04* (2013.01); *C08G 77/18* (2013.01); *C08G 77/388* (2013.01); *C08G 77/70* (2013.01); *C08K 3/04* (2013.01); *C08K 3/042* (2017.05); *C08K 2003/0806* (2013.01); *C08K 2003/085* (2013.01); *C08K 5/5435* (2013.01); *C08K 5/544* (2013.01); *C08K 5/548* (2013.01); *C08K 2201/001* (2013.01); *C08L 2203/20* (2013.01); *C08L 2205/025* (2013.01); *C08L 2312/08* (2013.01)

(58) Field of Classification Search
CPC ........ C08G 77/08; C08G 77/16; C08G 77/24; C08G 77/26; C08G 18/3893; C08G 18/2885; C08G 18/718; C08G 18/3206; C08G 18/5015; C08G 18/10; C08G 18/24; C08G 18/61; C08G 77/70; C08G 77/18; C08G 65/336; C08G 77/04; C08G 77/388; C08K 3/041; C08K 3/08; C08K 9/02; C08K 3/013; C08K 5/57; C08K 5/544; C08K 2003/0806; C08K 2003/085; C08K 2201/001; C08K 5/5435; C08K 3/04; C08K 3/042; C08K 5/548; C08K 5/34924; C08K 5/5455; C08K 5/5419; C08L 83/04; C08L 75/04; C08L 75/08; C08L 83/08; C08L 83/10; C08L 83/14; C08L 2203/20; C08L 2312/08; C08L 71/00; C08L 71/02; C09D 183/14
See application file for complete search history.

(56) References Cited

U.S. PATENT DOCUMENTS 4,545,914 A    10/1985    Graiber et al.
6,210,789 B1    4/2001    Hanrahan
(Continued)

FOREIGN PATENT DOCUMENTS

CN    1860181    11/2006
CN    1902249    1/2007
(Continued)

OTHER PUBLICATIONS

Patent Cooperation Treaty (PCT), International Search Report and Written Opinion for Application PCT/US2019/067021 filed Dec. 18, 2019, mailed Apr. 30, 2020, International Searching Authority, EP.

*Primary Examiner* — Patrick D Niland
(74) *Attorney, Agent, or Firm* — Joseph Waters; McDonald Hopkins LLC

(57) ABSTRACT

The present technology provides a curable silicone-based composition comprising a hybrid silicone polymer, a catalyst, and a filler. The present technology provides a curable silicone composition comprising a polymer A comprising an organic molecule or a siloxane molecule comprising an alkoxy radical, a hydroxyl radical, an isocyanate radical, a primary amine, or a carboxylic radical; optionally a polymer B comprising an organic molecule, a siloxane molecule, or a hybrid-siloxane molecule; a catalyst; and a filler.

22 Claims, No Drawings

(51) Int. Cl.

| | |
|---|---|
| *C08G 77/16* | (2006.01) |
| *C08G 77/24* | (2006.01) |
| *C08G 77/26* | (2006.01) |
| *C08K 3/013* | (2018.01) |
| *C08K 3/04* | (2006.01) |
| *C08K 3/08* | (2006.01) |
| *C08K 5/57* | (2006.01) |
| *C08K 9/02* | (2006.01) |
| *C08L 75/04* | (2006.01) |
| *C08L 75/08* | (2006.01) |
| *C08L 83/08* | (2006.01) |
| *C08L 83/10* | (2006.01) |
| *C08L 83/14* | (2006.01) |
| *C09D 183/14* | (2006.01) |
| *C08G 65/336* | (2006.01) |
| *C08G 77/00* | (2006.01) |
| *C08G 77/04* | (2006.01) |
| *C08G 77/18* | (2006.01) |
| *C08G 77/388* | (2006.01) |
| *C08K 5/5435* | (2006.01) |
| *C08K 5/544* | (2006.01) |
| *C08K 5/548* | (2006.01) |

(56) References Cited

U.S. PATENT DOCUMENTS

| | | |
|---|---|---|
| 6,635,354 B2 | 10/2003 | Bunyan et al. |
| 6,902,688 B2 | 6/2005 | Narayan et al. |
| 7,603,894 B2 | 10/2009 | Breed |
| 7,803,894 B2 | 9/2010 | Dams et al. |
| 2004/0169162 A1 | 9/2004 | Xiao et al. |
| 2004/0242762 A1 | 12/2004 | Horikoshi et al. |
| 2005/0165169 A1 | 7/2005 | Levey et al. |
| 2007/0129528 A1 | 6/2007 | Huang et al. |
| 2007/0185259 A1 | 8/2007 | Hoshino |
| 2007/0240988 A1 | 10/2007 | Cheng et al. |
| 2009/0226742 A1 | 9/2009 | Blum et al. |
| 2011/0237734 A1 | 9/2011 | Ramakrishnan et al. |
| 2012/0214925 A1 | 8/2012 | Gubbels et al. |
| 2016/0340548 A1 | 11/2016 | Gubbels et al. |
| 2018/0086950 A1 | 3/2018 | Kunimune et al. |

FOREIGN PATENT DOCUMENTS

| | | |
|---|---|---|
| CN | 101336258 | 12/2008 |
| CN | 105238007 | 1/2016 |
| CN | 106816315 | 6/2017 |
| CN | 107075603 | 8/2017 |
| CN | 107163896 | 9/2017 |
| CN | 108893088 | 11/2018 |
| JP | H4093359 | 3/1992 |
| JP | H11293020 | 10/1999 |
| JP | 2002194278 | 7/2002 |
| JP | 2004352947 | 12/2004 |
| JP | 2005187793 | 7/2005 |
| JP | 2013508493 | 3/2013 |
| JP | 2013523956 | 6/2013 |
| JP | 2015124321 | 7/2015 |
| JP | 2016079230 | 5/2016 |
| JP | 2017502147 | 1/2017 |
| JP | 2017101171 | 6/2017 |
| JP | 2018048286 | 3/2018 |
| KR | 20040099821 | 12/2004 |
| KR | 20050041213 | 5/2005 |
| WO | 2007064621 | 6/2007 |
| WO | 2009111049 | 9/2009 |

CURABLE SILICONE-BASED COMPOSITIONS AND APPLICATIONS THEREOF

FIELD

The present application claims priority to and the benefit of International Application PCT/US2019/067021 filed on Dec. 18, 2019, which claims priority to and the benefit of India provisional application 20/182,1049328 filed on Dec. 26, 2018, the disclosure of each of which is incorporated herein by reference in its entirety.

FIELD

The present technology relates to curable silicone-based compositions. In particular, the present technology relates to a curable silicone-based composition comprising a hybrid silicone polymer, a catalyst, and a filler. The composition provides a silicone composite on curing.

BACKGROUND

Silicones are known for their inherent properties such as high thermal stability, flexibility, and/or chemical resistance. Siloxanes are used for electronic or electrical applications based on their properties such as those mentioned above. While it might be desirable to use siloxanes in applications where electrical conductivity may be important, developing electrically conductive siloxane materials is challenging.

Electrical properties can be achieved in silicones by adding fillers into the silicone matrix, and desired conductivity may be achieved by increasing the filler loading in the composition. At higher loadings, however, the filler particles may separate out from the composition over a period of time. Hence, the dispersion of fillers with higher loading in the siloxane matrix is a major challenge. Higher loadings of fillers in the composition may also adversely affect the curing kinetics and processability of the composition. Other common challenges include, but are not limited to, variable contact resistance and volume resistivity.

To solve these technical problems, an effort was made to develop curable silicone compositions with desired mechanical and chemical properties.

BRIEF DESCRIPTION OF THE INVENTION

Provided is a curable silicone composition that can provide desired adhesion and other mechanical and chemical properties along with good conductivity. In some embodiments, the present technology provides a curable composition comprising a polymer A, a catalyst, and one or more fillers, wherein the polymer A includes siloxane, or hybrid siloxane molecules.

In some embodiments, the curable composition further comprises a polymer B. In one or more embodiments, the polymer B may function as a cross-linker. In one or more embodiments, the polymer B may include a siloxane, a hybrid siloxane, silane or combinations thereof. In these embodiments, the curable composition comprises a polymer A, a polymer B, a catalyst, and one or more fillers, wherein the polymer A includes siloxane, or hybrid siloxane molecules. In these embodiments, the polymer A comprises an alkoxy radical, a hydroxyl radical, an isocyanate radical, a primary amine, or a carboxylic radical.

In some embodiments, a curable silicone composition is provided. The composition comprises (i) a polymer A of Formula 1; (ii) a filler; (iii) a catalyst, and optionally (iv) a polymer B of Formula 2; wherein the curable silicone composition is a condensation cure system; and the cured form of the curable composition is a conductive material. The polymer A can be represented by Formula 1:

$$(R)_a(W)_b(R)_{a''} \qquad \text{Formula 1}$$

wherein a, a" and b can be zero or greater, with the proviso that a+a"+b is always greater than 0, R can be represented by Formula (1a) which can be linear or branched:

$$(CH_2)_c(CH_2O)_d(CHOH)_e(S)_f(X)_g \qquad \text{Formula (1a)}$$

S can be independently selected from a hydroxyl radical, an isocyanate radical, a primary amine, or a carboxylic radical and X is independently selected from Formula (1b)

wherein $R_1$, $R_1'$, and $R_1''$ are independently selected from an alkyl radical, an alkoxy radical, a hydroxyl radical, a hydrogen radical or from un-substituted hydrocarbons, or fluorinated hydrocarbon having C1-C20 carbon atoms, c, d, e, f, g is an integer and can be 0 or greater with the proviso that c+d+e+f+g>0, W in Formula 1 can be represented by Formula (1c)

$$(Y)_h(Z)_i \qquad \text{Formula (1c)}$$

wherein h, i can be zero or greater with the proviso that h+i>0,

Y in formula (1c) can be represented by Formula (Id):

$$(M_1)_{x''}(D_1)_j(D_2)_k(D^*)_l(T_1)_m(Q_1)_n(M_2)_{y''} \qquad \text{Formula (1d)}$$

Wherein j, k, l, m, n, x", and y" can be zero or greater with the proviso that (j+k+l+m+n+x"+y")>0, wherein $M_1$ is represented by Formula (1e):

$$R_2R_3R_4SiI_{1/2} \qquad \text{Formula (1e)}$$

$D_1$ is represented by Formula (1f):

$$R_5R_6SiI_{2/2} \qquad \text{Formula (1f)}$$

$D_2$ is represented by Formula (1g):

$$R_7R_8SiI_{2/2} \qquad \text{Formula (1g)}$$

D* is represented by Formula (1h):

$D_3$ is represented by Formula (1i):

$$R_9R_{10}SiI_{2/2} \qquad \text{Formula (1i)}$$

$D_4$ is represented by Formula (1j):

$$R_{11}R_{12}SiI_{2/2} \qquad \text{Formula (1j)}$$

$D_5$ is represented by Formula (1k):

$$R_{13}R_{14}SiI_{2/2} \qquad \text{Formula (1k)}$$

$D_6$ is represented by Formula (1l):

$$R_{15}R_{16}SiI_{2/2} \qquad \text{Formula (1l)}$$

$T_1$ is represented by Formula (1m):

$$R_{17}SiI_{3/2} \quad \text{Formula (1m)}$$

$Q_1$ is represented by Formula (1n):

$$SiI_{4/2} \quad \text{Formula (1n)}$$

$M_2$ is represented by Formula (1o):

$$R_{18}R_{19}R_{20}SiI_{1/2} \quad \text{Formula (1o)}$$

$R_2$-$R_{20}$ can be independently selected from R, or a monovalent cyclic or acyclic, aliphatic or aromatic, substituted or un-substituted hydrocarbon, or a fluorinated hydrocarbon having $C_1$-$C_{20}$ carbon atoms or carboxylate radical or epoxy radical, wherein o, p can be zero or greater with the proviso that o+p>0, I can be selected from O or $CH_2$ group subject to the limitation that the molecule contains an even number of $O_{1/2}$ and even number of $(CH_2)_{1/2}$, Z in Formula (1c) can be represented by Formula (1p):

$$[E]_q[J]_r \quad \text{Formula (1p)}$$

wherein E can be independently selected from urethane, urea, anhydride, amide, imide, hydrogen radical, or a monovalent cyclic or acyclic, aliphatic or aromatic, substituted or un-substituted hydrocarbon, or a fluorinated hydrocarbon having 1-20 carbon atoms, q can be 0 or greater, r>0. J can be independently selected from Formula (1q) or (1q'):

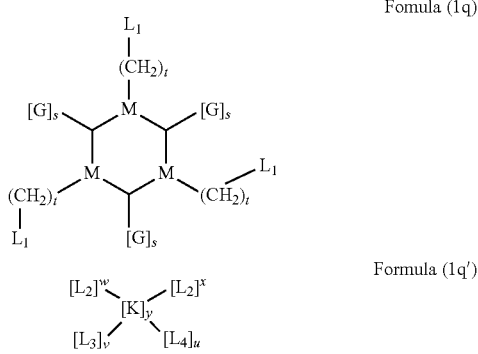

Fomula (1q)

Formula (1q')

wherein M can be independently selected from a carbon atom or a heteroatom,

G is a heteroatom selected from oxygen, wherein t, s can be zero or greater with the proviso that t+s>0, L1 can be independently selected from urethane, urea, anhydride, or amide, L2, L3, L4 can be independently selected from phthalimide, fluorinated hydrocarbon, substituted or unsubstituted hydrocarbon, substituted or unsubstituted aromatic hydrocarbon, u, V, w, x can be 0 or greater, and K can be independently selected from carbon, heteroatom, hydrocarbon, or carbonyl radical with the proviso that y>o.

The polymer B can be represented by Formula (2a):

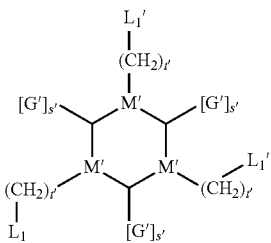

Formula (2a)

wherein M' can be independently selected from a carbon atom or a heteroatom,

G' is a heteroatom selected from oxygen, s' can be 0 or greater, t'>0, $L_1$' can be independently selected from an isocyanate, a primary amine, or from R' represented by Formula (2b):

$$(M_3)_{y''}(D_7)_{c'}(D_8)_{d'}(D^{**})_{e'}(T_2)_{f'}(Q_2)_{g'}(M_4)_{z'} \quad \text{Formula (2b)}$$

wherein $M_3$ is represented by Formula (2c):

$$R_{25}R_{26}R_{27}Si{I'}_{1/2} \quad \text{Formula (2c)}$$

$D_7$ is represented by Formula (2d)

$$R_{28}R_{29}Si{I'}_{2/2} \quad \text{Formula (2d)}$$

$D_8$ is represented by Formula (2e):

$$R_{30}R_{31}Si{I'}_{2/2} \quad \text{Formula (2e)}$$

$D^{**}$ is represented by Formula (2f):

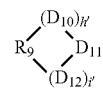

Formula (2f)

$D_9$ is represented by Formula (2g):

$$R_{32}R_{33}Si{I'}_{2/2} \quad \text{Formula (2g)}$$

$D_{10}$ is represented by Formula (2h):

$$R_{34}R_{35}Si{I'}_{2/2} \quad \text{Formula (2h)}$$

$D_{11}$ is represented by Formula (2i):

$$R_{36}R_{37}Si{I'}_{2/2} \quad \text{Formula (2i)}$$

$D_{12}$ is represented by Formula (2j):

$$R_{38}R_{39}Si{I'}_{2/2} \quad \text{Formula (2j)}$$

$T_2$ is represented by Formula (2k):

$$R_{40}Si{I'}_{3/2} \quad \text{Formula (2k)}$$

$Q_2$ is represented by Formula (2l):

$$Si{I'}_{4/2} \quad \text{Formula (2l)}$$

$M_4$ is represented by Formula (2m):

$$R_{41}R_{42}R_{43}Si{I'}_{1/2} \quad \text{Formula (2m)}$$

wherein $R_{25}$-$R_{43}$ can be independently selected from a hydrogen radical, a monovalent cyclic or acyclic, aliphatic or aromatic, substituted or un-substituted hydrocarbon, or a fluorinated hydrocarbon having $C_1$-$C_{20}$ carbon atoms, an alkoxy radical, or a hydroxyl radical, I' is O or $CH_2$ group subject to the limitation that the molecule contains an even number of $O_{1/2}$ and even number of $(CH_2)_{1/2}$ c', d', e', f', g', y" and z' can be zero or greater with the proviso that (c'+d'+e'+f'+g'+y"+z')>0, h', i'>0 when e'>0.

L1' of Formula (2a) can also be represented by Formula (2n):

$$(R')_{a'}(W')_{b'}(R')_{a''} \quad \text{Formula (2n)}$$

wherein R' is represented by Formula (2b) above,

W' can be independently selected from functionalities such as a substituted or unsubstituted hydrocarbon radical of 1-20 carbon atom, a fluorinated hydrocarbon, or a perfluroether, a', a" can be 0 or greater with the proviso that a"+a'">0, and b' can be 0 or greater.

The polymer B can also be represented by Formula (2a'):

$$[E']_{q'}[J']_{r'} \quad \text{Formula (2a')}$$

wherein E' can be independently selected from R', isocyanate, amine, hydrogen, a monovalent cyclic or acyclic, aliphatic or aromatic, substituted or un-substituted hydrocarbon, or a fluorinated hydrocarbon having $C_1$-$C_{20}$ carbon atoms, or combinations thereof, wherein q', r' can be zero or greater with the proviso that q'+r'>0, J' can be independently selected from Formula (2b'):

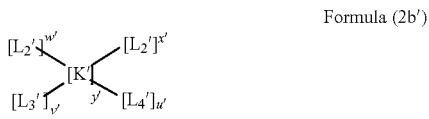

Formula (2b')

L2', L3', L4' can be independently selected from a phthalimide radical, a fluorinated hydrocarbon, a substituted or unsubstituted hydrocarbon, a substituted or unsubstituted aliphatic or aromatic hydrocarbon, a urea linkage, alkoxy or a urethane linkage, u', v', w', x' can be 0 or greater with the proviso that (u'+v'+w'+x')>0, K can be independently selected from carbon, silicon, a heteroatom, a hydrocarbon radical, or a carbonyl radical with the proviso that y'>0.

These and other embodiments and aspects are further understood with reference to the following detailed description.

DETAILED DESCRIPTION

In the following specification and the claims, which follow, reference will be made to a number of terms, which shall be defined to have the following meanings.

The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

As used herein, the term "aromatic" and "aromatic radical" are used interchangeably and refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly, a tetrahydronaphthyl radical is an aromatic radical comprising an aromatic group ($C_6H_3$) fused to a nonaromatic component —$(CH_2)_4$—. For convenience, the term "aromatic radical" or "aromatic" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a C7 aromatic radical comprising a methyl group, the methyl group being a functional group which is an alkyl group. Similarly, the 2-nitrophenyl group is a C6 aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC($CF_3$)$_2$PhO—), 4-chloromethylphen-1-yl, 3-trifluorovinyl-2-thienyl, 3-trichloromethylphen-1-yl (i.e., 3-$CCl_3$Ph-), 4-(3-bromoprop-1-yl) phen-1-yl (i.e., 4-$BrCH_2CH_2CH_2$Ph-), and the like. Further examples of aromatic radicals include 4-allyloxyphen-1-oxy, 4-aminophen-1-yl (i.e., 4-$H_2$NPh-), 3-aminocarbonylphen-1-yl (i.e., $NH_2$COPh-), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e.,-OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphen-1-yl, 4-vinylphen-1-yl, vinylidenebis(phenyl), and the like. The term "a C3-C10 aromatic radical" includes aromatic radicals containing at least three but no more than 10 carbon atoms. The aromatic radical 1-imidazolyl($C_3H_2N_2$—) represents a C3 aromatic radical. The benzyl radical ($C_7H_7$—) represents a C7 aromatic radical. In one or more embodiments, the aromatic groups may include C6-C30 aromatic groups, C10-C30 aromatic groups, C15-C30 aromatic groups, C20-C30 aromatic groups. In some specific embodiments, the aromatic groups may include C3-C10 aromatic groups, C5-C10 aromatic groups, or C8-C10 aromatic groups.

As used herein the term "cycloaliphatic group" and "cycloaliphatic radical" may be used interchangeably and refers to a radical having a valence of at least one, and wherein the radicalcomprises an array of atoms which is cyclic but not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a C6 cycloaliphatic radical comprising a methyl group, the methyl group being a functional group which is an alkyl group. Similarly, the 2-nitrocyclobut-1-yl radical is a C4 cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —$C_6H_{10}C(CF_3)_2C_6H10$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., $CH_3CHBrCH_2C_6H_{10}O$—), and the like. Further examples of cycloaliphatic radicals include 4-allyloxycyclohex-1-yl, 4-aminocyclohex-1-yl (i.e., $H_2C_6H_{10}$—), 4-aminocarbonylcyclopent-1-yl (i.e., $NH_2COC_5H_8$—), 4-acetyloxycyclohex-1-yl, 2,2-dicyanoisopropylidenebis(cyclohex-4-yloxy) (i.e., —$OCH_{10}C(CN)_2C_6H_{10}O$—), 3-methylcyclohex-1-yl, methylenebis(cyclohex-4-yloxy) (i.e., —$OC_6H_{10}CH_2C_6H_{10}O$—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —$OC_6H_{10}(CH_2)_6C_6H_{10}O$—), 4-hydroxymethylcyclohex-1-yl (i.e., 4-$HOCH_2C_6H_{10}$—), 4-mercaptomethylcyclohex-1-yl (i.e., 4-$HSCH_2C_6H10$—), 4-methylthiocyclohex-1-yl (i.e., 4-$CH_3SC_6H_{10}$—), 4-methoxycyclohex-1-yl, 2-methoxycarbonylcyclohex-1-yloxy (2-$CH_3OCOC_6H_{10}O$—), 4-nitromethylcyclohex-1-yl (i.e., $NO_2CH_2C_6H10$—), 3-trimethylsilylcyclohex-1-yl, 2-t-butyldimethylsilylcyclopent-1-yl, 4-trimethoxysilylethylcyclohex-1-yl (e.g., $(CH_3O)_3SiCH_2CH_2C_6H_{10}$—), 4-vinylcyclohexen-1-yl, vinylidenebis(cyclohexyl), and the like. The term "a C3-C10 cycloaliphatic radical" includes cycloaliphatic radicals containing at least three but no more than 10 carbon atoms. The cycloaliphatic radical 2-tetrahydrofuranyl($C_4H_7O$—) represents a C4 cycloaliphatic radical. The cyclohexylmethyl radical ($C_6H_{11}CH_2$—) represents a C7 cycloaliphatic radical. In some embodiments, the cycloaliphatic groups may include C3-C20 cyclic groups, C5-C15 cyclic groups, C6-C10 cyclic groups, or C8-C10 cyclic groups.

As used herein the term "aliphatic group" and "aliphatic radical" are used interchangeably and refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkenyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C6 aliphatic radical comprising a methyl group, the methyl group being a functional group which is an alkyl group. Similarly, the 4-nitrobut-1-yl group is a C4 aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals include allyl, aminocarbonyl (i.e., —$CONH_2$), carbonyl, 2,2-dicyanoisopropylidene (i.e., —$CH_2C(CN)_2CH_2$—), methyl (i.e., —$CH_3$), methylene (i.e., —$CH_2$—), ethyl, ethylene, formyl (i.e., —CHO), hexyl, hexamethylene, hydroxymethyl (i.e., —$CH_2OH$), mercaptomethyl (i.e., —$CH_2SH$), methylthio (i.e., —$SCH_3$), methylthiomethyl (i.e., —$CH_2SCH_3$), methoxy, methoxycarbonyl (i.e., $CH_3OCO$—), nitromethyl (i.e., —$CH_2NO_2$), thiocarbonyl, trimethylsilyl (i.e., $(CH_3)_3Si$—), t-butyldimethylsilyl, 3-trimethyoxysilylpropyl (i.e., $(CH_3O)_3SiCH_2CH_2CH_2$—), vinyl, vinylidene, and the like. By way of further example, a C1-C10 aliphatic radical contains at least one but no more than 10 carbon atoms. A methyl group (i.e., $CH_3$—) is an example of a C1 aliphatic radical. A decyl group (i.e., $CH_3(CH_2)_9$—) is an example of a C10 aliphatic radical. In one or more embodiments, the aliphatic groups or aliphatic radical may include, but is not limited to, a straight chain or a branched chain hydrocarbon having 1-20 carbon atoms, 2-15 carbon atoms, 3-10 carbon atoms, or 4-8 carbon atoms.

The present technology provides curable silicone-based compositions and the use of such compositions in a variety of applications. The curable silicone composition provides desired adhesion and other mechanical and chemical properties along with good electrical conductivity. Selection of polymer A, and one or more fillers, and optionally a polymer B, as described herein in the composition provides a hybrid composite material with multifaceted properties. Further, the present compositions allow for the use of relatively high loadings of fillers in the silicone matrix without affecting the curing and processing conditions of the compositions. The presence of non-silicone organic units can be employed to provide additional benefits to the overall properties of the hybrid silicone composites.

In some embodiments, the present technology provides a curable composition comprising a polymer A, a catalyst, and one or more fillers, wherein the polymer A includes hybrid siloxane molecules. The composition may be cured by condensation curing. This curing does not require a separate cross-linker. In some embodiments, the curable composition further comprises a polymer B.

One or more embodiments of the present technology provides, a curable composition comprising a polymer A, one or more fillers, and optionally a polymer B. Polymer A comprises an organic molecule or a siloxane molecule comprising alkoxy radical, a hydroxyl radical, an isocyanate radical, a primary amine, or a carboxylic radical. Polymer B comprises an organic molecule, a siloxane molecule, or a hybrid-siloxane molecule. In some of those embodiments, the polymer B may function as an organic cross-linker, a siloxane cross-linker, or a hybrid cross-linker. In the hybrid cross-linker, both the organic unit and the siloxane unit are present. The curable composition of these embodiments may form hybrid silicone composites on curing.

In some embodiments, the polymer A can be represented by Formula 1:

$$(R)_a(W)_b(R)_{a''} \quad \text{Formula 1}$$

wherein a and a" can be zero or greater and b cannot be zero, with the proviso that a+a"+b is always greater than 0, R can be represented by Formula (1a):

$$(CH_2)_c(CH_2O)_d(CHOH)_e(S)_f(X)_g \quad \text{Formula (1a)}$$

R as shown in Formula (1a) can represent a linear or a branched structure,

S can be independently selected from a hydroxyl radical, an isocyanate radical, a primary amine, or a carboxylic radical, X is independently selected from Formula (1b):

$$\text{Formula (1b)}$$

$$\sim\!\!\!\sim\!\!\!\sim\!\!Si\!\!\begin{array}{c}R_1\\|\\-R_1'\\|\\R_1''\end{array}$$

$R_1$, $R_1'$, and $R_1''$ are independently selected from an alkyl radical, an alkoxy radical, a hydroxyl radical, a hydrogen radical, or from a substituted or unsubstituted hydrocarbons, or a fluorinated hydrocarbon having C1-C20 carbon atoms, c, d, e, f, g is an integer and can be 0 or greater with the proviso that c+d+e+f+g>0, W in Formula 1 can be represented by Formula (1c)

$$(Y)_h(Z)_i \quad \text{Formula (1c)}$$

wherein h, i can be zero or greater with the proviso that h+i>0,

Y in formula (1c) can be represented by Formula (1d):

$$(M_1)_{x''}(D_1)_j(D_2)_k(D^*)_l(T_1)_m(Q_1)_n(M_2)_{y''} \quad \text{Formula (1d)}$$

wherein j, k, l, m, n, x", and y" can be zero or greater with the proviso that (j+k+l+m+n+x"+y")>0.

$M_1$ is represented by Formula (1e):

$$R_2R_3R_4SiI_{1/2} \quad \text{Formula (1e)}$$

$D_1$ is represented by Formula (1f):

$$R_5R_6SiI_{2/2} \quad \text{Formula (1f)}$$

$D_2$ is represented by Formula (1g):

$$R_7R_8SiI_{2/2} \quad \text{Formula (1g)}$$

D* is represented by Formula (1h):

$$\text{Formula (1h)}$$

$$D_3\!\!\begin{array}{c}(D_4)_o\\\diagup\\\diagdown\\(D_6)_p\end{array}\!\!D_5$$

$D_3$ is represented by Formula (1i):

$$R_9R_{10}SiI_{2/2} \quad \text{Formula (1i)}$$

$D_4$ is represented by Formula (1j):

$$R_{11}R_{12}SiI_{2/2} \quad \text{Formula (1j)}$$

$D_5$ is represented by Formula (1k):

$$R_{13}R_{14}SiI_{2/2} \quad \text{Formula (1k)}$$

$D_6$ is represented by Formula (1l):

$$R_{15}R_{16}SiI_{2/2} \quad \text{Formula (1l)}$$

$T_1$ is represented by Formula (1m):

$$R_{17}SiI_{3/2} \quad \text{Formula (1m)}$$

$Q_1$ is represented by Formula (1n):

$$SiI_{4/2} \quad \text{Formula (1n)}$$

$M_2$ is represented by Formula (1o):

$$R_{18}R_{19}R_{20}SiI_{1/2} \quad \text{Formula (1o)}$$

$R_2$-$R_{20}$ can be independently selected from R, a monovalent cyclic or acyclic, aliphatic or aromatic, substituted or un-substituted hydrocarbon, or a fluorinated hydrocarbon having $C_1$-$C_{20}$ carbon atoms or carboxylate radical or epoxy radical, wherein o, p can be zero or greater with the proviso that o+p>0, I can be O or $CH_2$ group subject to the limitation that the molecule contains an even number of $O_{1/2}$ and even number of $(CH_2)_{1/2}$, Z in Formula (1c) can be represented by Formula (1p):

$$[E]q[J]r \quad \text{Formula (1p)}$$

wherein E can be independently selected from a urethane, a urea, an anhydride, an amide, an imide, a hydrogen radical, or a monovalent cyclic or acyclic, aliphatic or aromatic, substituted or un-substituted hydrocarbon, or a fluorinated hydrocarbon having 1-20 carbon atoms, q can be 0 or greater, r>0.

J can be independently selected from Formula (1q) or (1q'):

$$\text{Formula (1q)}$$

$$\begin{array}{c}L_1\\|\\(CH_2)_t\\[G]_s\!\!-\!\!M\!\!-\![G]_s\\|\\M\quad M\!\!-\!\!L_1\\(CH_2)_t\quad\quad(CH_2)_t\\|\quad\quad\quad|\\L_1\quad[G]_s\end{array}$$

$$\text{Formula (1q')}$$

$$\begin{array}{c}[L_2]_w\!\!\diagdown\quad\diagup[L_2]_x\\[K]_y\\[L_3]_v\!\!\diagup\quad\diagdown[L_4]_u\end{array}$$

wherein M can be independently selected from a carbon atom or a heteroatom,

G is a heteroatom selected from oxygen, wherein t, s can be zero or greater with the proviso that t+s>0, $L_1$ can be independently selected from a urethane, a urea, an anhydride, or an amide, $L_2$, $L_3$, $L_4$ can be independently selected from a phthalimide, a fluorinated hydrocarbon, a substituted or unsubstituted hydrocarbon, a substituted or unsubstituted aromatic hydrocarbon, u, v, w, x can be 0 or greater, K can be independently selected from carbon, a heteroatom, a hydrocarbon, or a carbonyl radical with the proviso that y>0.

In embodiments, each of the a, a" and b is 1.and c, d, e in R are independently can be 0, 1-10, 10-20, 5-20, 10-30. f, g are independently 1. Further, h and i in W are independently 1. x", y", m, n in Y are independently 0-10. j, k and l in Y are independently 0-100. o. p in D* are independently 0-10. q, r in Z are independently 1. t, s in J are independently 0, 1-10, 10-20 and M is carbon/or nitrogen. u, v, w, x in J are independently 0, 1-10, or 10-20 and y is 1-10.

In one or more embodiments, Polymer A can be represented by the following structures:

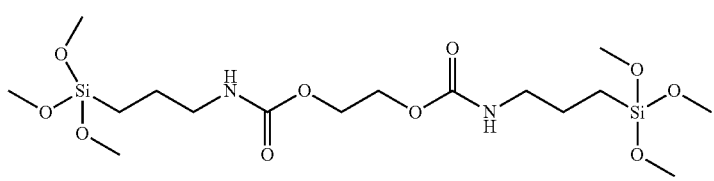

Structure I

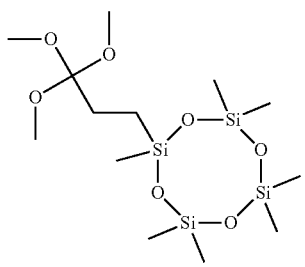

Structure II

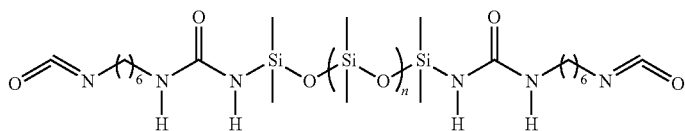

Structure V

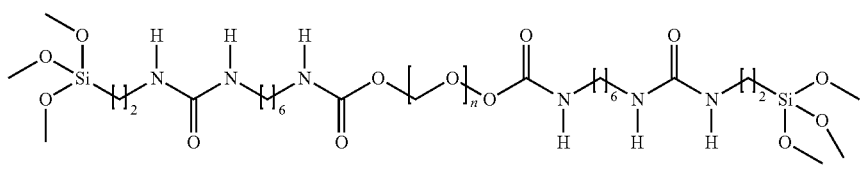

Structure VI

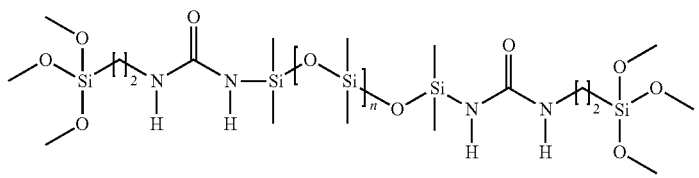

Structure VII

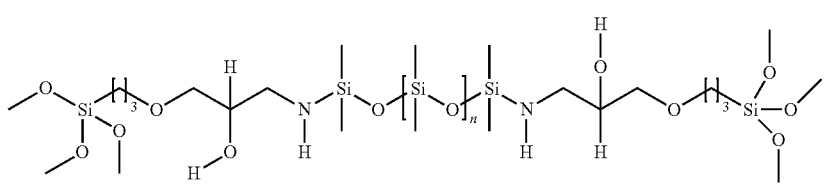

Structure VIII

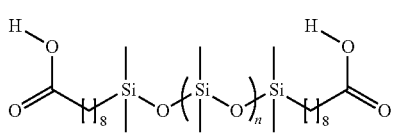

Structure IX

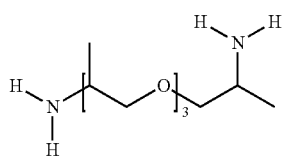

Structure X

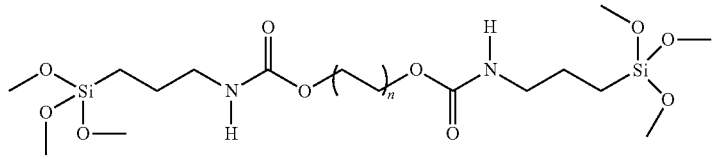

Structure XI

In some embodiments, the polymer B can be represented by Formula (2a):

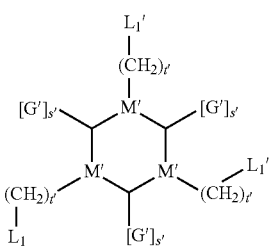

Formula (2a)

wherein M' can be independently selected from a carbon atom or a heteroatom,
G' is a heteroatom selected from oxygen,
s' can be 0 or greater,
t'>0,
$L_1'$ can be independently selected from isocyanate or primary amine or from R' represented by Formula (2b) or (2n) where Formula (2b) is a compound of the formula:

$$(M_3)_{y''}(D_7)_{c'}(D_8)_{d'}(D^{**})_{e'}(T_2)_{f'}(Q_2)_{g'}(M_4)_{z'}$$  Formula (2b)

wherein $M_3$ is represented by Formula (2c):

$$R_{25}R_{26}R_{27}SiI'_{1/2}$$  Formula (2c)

$D_7$ is represented by Formula (2d)

$$R_{28}R_{29}SiI'_{2/2}$$  Formula (2d)

$D_8$ is represented by Formula (2e):

$$R_{30}R_{31}SiI'_{2/2}$$  Formula (2e)

$D^{**}$ is represented by Formula (2f):

Formula (2f)

$D_9$ is represented by Formula (2g):

$$R_{32}R_{33}SiI'_{2/2}$$  Formula (2g)

$D_{10}$ is represented by Formula (2h):

$$R_{34}R_{35}SiI'_{2/2}$$  Formula (2h)

$D_{11}$ is represented by Formula (2i):

$$R_{36}R_{37}SiI'_{2/2}$$  Formula (2i)

$D_{12}$ is represented by Formula (2j):

$$R_{38}R_{39}SiI'_{2/2}$$  Formula (2j)

$T_2$ is represented by Formula (2k):

$$R_{40}SiI'_{3/2}$$  Formula (2k)

$Q_2$ is represented by Formula (2l):

$$SiI'_{4/2}$$  Formula (2l)

$M_4$ is represented by Formula (2m):

$$R_{41}R_{42}R_{43}SiI'_{1/2}$$  Formula (2m)

wherein $R_{25}$-$R_{43}$ can be independently selected from a hydrogen radical, a monovalent cyclic or acyclic, aliphatic or aromatic, substituted or un-substituted hydrocarbon, or a fluorinated hydrocarbon having $C_1$-$C_{20}$ carbon atoms, an alkoxy radical, or a hydroxyl radical,
I' is O or a $CH_2$ group subject to the limitation that the molecule contains an even number of $O_{1/2}$ and even number of $(CH_2)_{1/2}$,
c', d', e', f, g', y"and z' can be zero or greater with the proviso that (c'+d'+e'+f+g'+y"+z')>0, h', i' >0 when e'>0.

$L_1'$ of Formula (2a) can also be represented by Formula (2n):

$$(R')_{a'}(W')_{b'}(R')_{a''}$$  Formula (2n)

wherein R' is represented by Formula (2b) above,
W' can be independently selected from functionalities like a substituted or unsubstituted hydrocarbon radical of 1-20 carbon atom, a fluorinated hydrocarbon, or a perfluroether, a', a" and b' can be 0 or greater with the proviso that a'+a'''+b'>0.

In some embodiments, the polymer B can be represented by Formula (2a'):

$$[E']_{q'}[J']_{r'}$$  Formula (2a')

wherein E' can be independently selected from R', an isocyanate, an amine, hydrogen, a monovalent cyclic or acyclic, aliphatic or aromatic, substituted or un-substituted hydrocarbon, or a fluorinated hydrocarbon having $C_1$-$C_{20}$ carbon atoms, or combinations thereof,
wherein q', r' can be zero or greater with the proviso that q'+r'>0, J' can be independently selected from Formula (2b'):

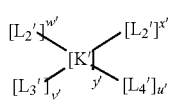

Formula (2b')

where L2', L3', L4' can be independently selected from a phthalimide radical, a fluorinated hydrocarbon, a substituted or unsubstituted hydrocarbon, a substituted or unsubstituted aliphatic or aromatic hydrocarbon, a urea linkage, alkoxy or a urethane linkage, u', v', w', x' can be 0 or greater with the proviso that (u'+v'+w'+x')>0, K can be independently selected from carbon, silicon, a heteroatom, a hydrocarbon radical, or a carbonyl radical with the proviso that y'>0.

In embodiments, M' can be independently carbon or nitrogen. s' is 1 and t' is independently 1-5, 5-10, or 10-20. c', d', e' in R' are independently 0-100 and f', g', y", z' in R' are independently 0, or 1-10. InD**, h' and i' can be independently 0 or 1-10. Further, a' and a" are 1 in L' and b' is 1-15. q' is 1 when r' is zero. u', v', w', x'in J' are independently 0, 1-10, or 10-20 and y' is 1.

In one or more embodiments, polymer B can be represented by the following structures:

Structure III

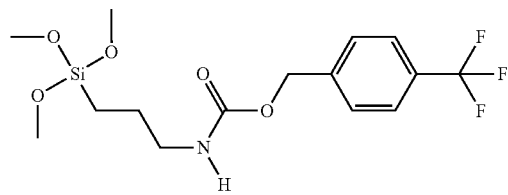

Structure IV

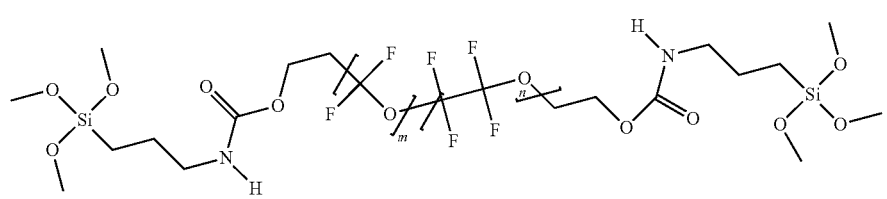

m + n = 9

Structure XII

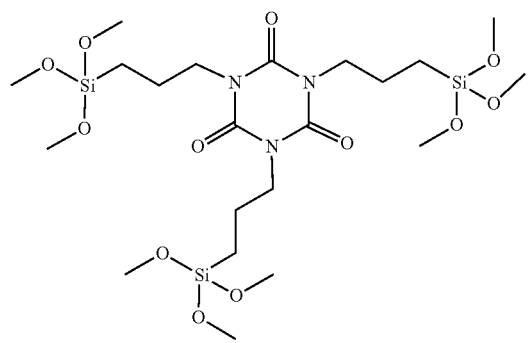

Structure XIII

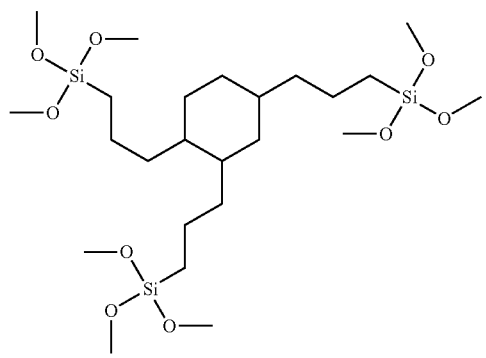

Structure XIV

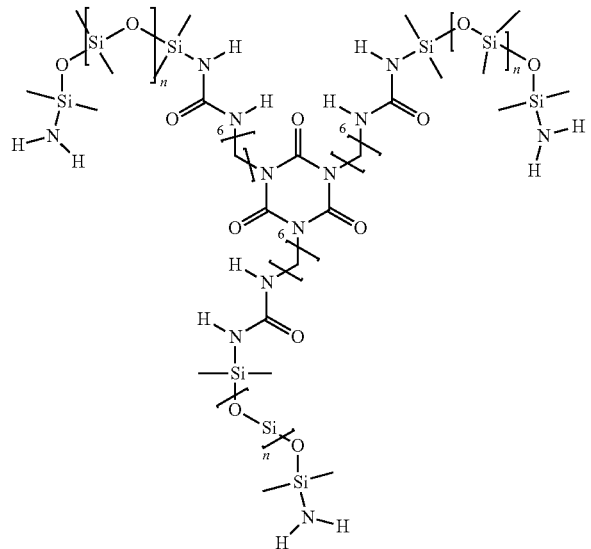

Structure XV

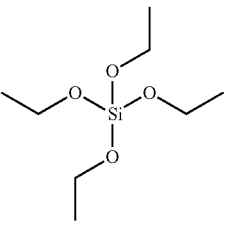

Various weight ratios of polymer A, polymer B, or both polymer A and polymer B are added to the composition to achieve desired properties for the hybrid composite. In one or more embodiments, the curable composition comprises the polymer A in a range from about 5% to 60%. In some embodiments, the curable composition comprises the polymer A in a range from about 10% to 50%. In some embodiments, the curable composition comprises the polymer A in a range from about 20% to 50%. In some embodiments, the curable composition comprises the polymer A in a range from about 30% to 50%. In some embodiments, the curable composition comprises the polymer A in a range from about 30% to 40%. In some embodiments, the curable composition comprises the polymer A in a range from about 25% to 40%. In some embodiments, the curable composition comprises 30% of polymer A. In some of these embodiments, the composition only comprises polymer A of 30%.

In one or more embodiments, the curable composition further comprises polymer B, wherein the polymer B is in a range from about 1% to 80%. In some embodiments, the curable composition comprises the polymer B in a range from about 2% to 75%. In some embodiments, the curable composition comprises the polymer B in a range from about 10% to 75%. In some embodiments, the curable composition comprises the polymer B in a range from about 15% to 80%. In some embodiments, the curable composition comprises the polymer B in a range from about 20% to 75%. In some embodiments, the curable composition comprises the polymer B in a range from about 30% to 80%. In some embodiments, the curable composition comprises the polymer B in a range from about 10% to 30%.

As noted, the composition comprises one or more fillers, wherein the fillers include, but are not limited to, alumina, silicon, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, wollastonite, alumina, aluminum nitride, graphite, graphene, metal coated graphite, metal coated graphene, aluminum powder, copper powder, bronze powder, brass powder, fibers or whiskers of carbon, graphite, silicon carbide, silicon nitride, alumina, aluminum nitride, silver, zinc oxide, carbon nanotubes, boron nitride nanosheets, zinc oxide nanotubes, black phosphorous, silver coated aluminum, silver coated glass, silver plated aluminum, nickel plated silver, nickel plated aluminum, carbon black of different structures, Monel mesh and wires, and combinations of two or more thereof.

In one or more embodiments, the fillers include graphite, nickel-coated graphite, silver, copper or combinations thereof. In one or more embodiments, the fillers include graphite, nickel-coated graphite, or a combination thereof. In one embodiment, the filler is a nickel-coated graphite.

In some embodiments, the composition further comprises a secondary filler. The secondary filler may be a non-metallic based filler. In one or more embodiments, polypyrrole is used as a secondary filler. In some embodiments, the composition comprises 0.1 to 50% of secondary filler. In some embodiments, the composition comprises 0.1 to 30% of secondary filler. In one embodiment, the composition comprises 20% of secondary filler.

Various weight ratios of fillers are added to the composition to achieve desired properties for the hybrid composite. In one or more embodiments, the curable composition comprises the fillers in a range from about 5% to 80%. In some embodiments, the curable composition comprises the fillers in a range from about 20% to 80%. In some embodiments, the curable composition comprises the fillers in a range from about 20% to 60%. In some embodiments, the curable composition comprises the fillers in a range from about 30% to 80%. In some embodiments, the curable composition comprises the fillers in a range from about 30% to 60%. In some embodiments, the curable composition comprises the fillers in a range from about 50% to 80%. In some embodiments, the curable composition comprises the fillers in a range from about 60% to 80%.

As noted, the curable composition comprises a catalyst, wherein the at least one catalyst is a condensation and/or crosslinking catalyst. In some embodiments, the composition may include a catalyst selected from the group consisting of metal condensation catalysts and non-metal condensation catalysts. The metal condensation catalyst may be at least one selected from the group consisting of tin, titanium, zirconium, lead, iron, cobalt, antimony, manganese, bismuth and zinc compounds. In one or more embodiments, the composition includes a tin catalyst.

In some embodiments, the composition comprises only polymer A, a catalyst and filler. In such embodiments, the catalyst is selected from Sn catalyst. In the presence of a Sn catalyst, the polymer A is cured to a cured composition without using any cross-linker. In such embodiments, the polymer A may be a silylated organic polymer, or silylated polyurethane organic polymer (silylated polyurethane resin or SPUR).

A catalyst will ordinarily be used in the preparation of the isocyanate-terminated PU prepolymers. Advantageously, condensation catalysts are employed since these will also catalyze curing (hydrolysis followed by crosslinking) of the SPU-resin component of the curable compositions of the invention. Suitable condensation catalysts include the dialkyltin dicarboxylates such as dibutyltin dilaurate and dibutyltin acetate, tertiary amines, the stannous salts of carboxylic acids, such as stannous octoate and stannous acetate, and the like. In one embodiment of the present invention, dibutyltin dilaurate catalyst is used in the production of the PUR prepolymer. Other useful catalysts include zirconium-containing and bismuth-containing complexes such as KAT XC6212, K-KAT XC-A209 and K-KAT 348, supplied by King Industries, Inc., aluminum chelates such as the TYZER® types, available from DuPont company, and the KR types, available from Kenrich Petrochemical, Inc., and other organometallic catalysts, e.g., those containing a metal such as Zn, Co, Ni, Fe, and the like.

In some embodiments, the composition comprises 0.0001 weight % to 0.1 weight % of catalyst. In some other embodiments, the composition comprises 0.0005 to 0.001 weight % of catalyst. In some other embodiments, the composition comprises 0.001 weight % to 0.1 weight % of catalyst. In some other embodiments, the composition comprises 0.005 weight % to 0.1 weight % of catalyst.

In some embodiments, the curable composition further comprises adhesion promoters selected from a trialkoxy epoxy silane, a trialkoxy primary amino silane, a combination of a primary and a secondary amine containing trialkoxy silane, a tris-(trialkoxy) isocyanurate based silane, an alkylthiocarboxylated trialkoxy silane.

In some embodiments, the curable composition further comprises a reactive diluent. The reactive diluent may include, but is not limited to, substituted glycidyl ether. The reactive diluent may include one or more solvents. Suitable solvents may include, but are not limited to, liquid hydrocarbons or silicone fluids. The hydrocarbon solvent may include a hexane or heptane, a silicone fluid may include polydiorganosiloxane.

In some embodiments, the curable composition further comprises a rheology modifier, or flow additives. The rheology modifier may include, but is not limited to, tetrahydrolinalool, thermoplastic resin and polyvinyl acetals. The flow additives may include, but is not limited silicone fluids, or acrylated copolymers.

In one or more embodiments, the formulation is prepared by homogenizing aa hybrid siloxane (polymer A) and the filler in presence of catalyst. The hybrid siloxane polymer (polymer A), a transition metal catalyst, and optionally a cross-linker (polymer B) are mixed with particulate filler in a high-speed mixer at 2000 rpm for 30-60 seconds. The mixture is cured at room temperature. A series of examples (as shown in the examples below) are prepared by using the cured composition. In one or more embodiments, the curing of the curable composition is a condensation curing.

In some embodiment, the application of the cured material and its end use is in coatings, adhesive, sealants, electrodes, ink, thermally conductive material, electrically conductive material, sensors, actuators, heating pad, antibacterial packaging material, conductive plastic, electromagnetic shielding material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

EXAMPLES

Example 1 OF POLYMER A Synthesis of Urethane Functional Alkoxy Siloxane (Structure I)

50 g of A-link 35* (Momentive Performance Material) was charged in a three necked round bottom flask under nitrogen atmosphere. To it, a Sn catalyst (0.01-0.05%) was added to the reaction mixture. 6.27 g of Ethylene glycol was added dropwise at room temperature. The reaction mixture was heated gently from room temperature to 80° C. for 12 hrs. After completion of the reaction by monitoring FTIR spectra, the reaction mixture was treated with activated charcoal to inactivate catalytic Sn. The reaction mixture was filtered off using Celite bed. The product was further purified by vacuum distillation to obtain approximately 70% pure product. The product (Structure I) was isolated and stored at room temperature.

Structure I

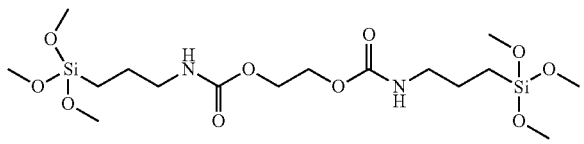

Example 2 OF POLYMER A: Synthesis of Alkoxy Functional Cyclic Siloxane (Structure II)

8.6 g of Vinyl trimethoxysilane was charged in a three necked round bottom flask under nitrogen atmosphere. Reactant was heated at 75 deg, followed by Karstedt's catalyst (5-10 ppm) was added to the reaction mixture. 15 g of Heptamethylcyclotetrasiloxane was added dropwise to the reaction mixture and exothermic in reaction mixture was observed up to 90 deg. Reaction mixture was stirred at 75 deg for 2 hrs. After completion of the reaction by monitoring 1HNMR spectra, the reaction mixture was treated with activated charcoal to inactivate catalytic Pt. The reaction mixture was filtered off using Celite bed. The product was further purified by vacuum distillation to obtain approximately 80% pure product. The product (Structure II) was isolated and stored at room temperature.

monitoring FTIR spectra, the reaction mixture was treated with activated charcoal to inactivate catalytic Sn. The reaction mixture was filtered off using Celite bed. The product was further purified by vacuum distillation to obtain approximately 65% pure product. The product (Structure III) was isolated and stored at room temperature.

Structure III

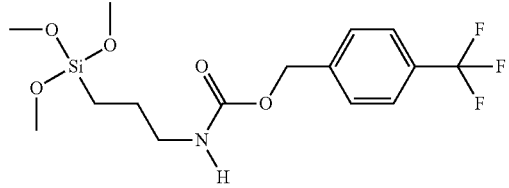

Structure II

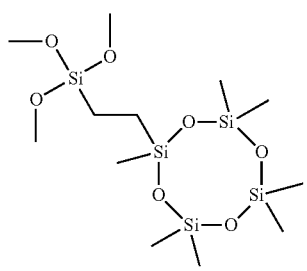

Example 1 OF POLYMER B: Synthesis of Urethane Functional Alkoxy Silane Having Fluorine Substituted Phenyl Ring (Structure III)

76 g of A-link 35* (Momentive Performance Material) was charged in a three necked round bottom flask under nitrogen atmosphere. To it, a Sn catalyst (0.01-0.05%) was added to the reaction mixture. 67 g of 4-(Trifluoromethyl) benzyl alcohol was added dropwise at room temperature. The reaction mixture was heated gently from room temperature to 70° C. for 12 hrs. After completion of the reaction by

EXAMPLE 2 OF POLYMER B: Synthesis of Fluoroether Functional Alkoxy Siloxane (Structure IV)

20 g of Fluorolink-E10H and 20 ml of 1,3 Bis(trifluoromethyl)benzene as a solvent was charged in a three necked round bottom flask under nitrogen purging. To it, a Sn catalyst (0.01-0.05%) was added to the reaction mixture. Then 5.1 g of A-link 35* (Momentive Performance Material) was added into the reaction mixture. Reaction mixture was heated at 70° C. for 10 hrs. After completion of the reaction by monitoring FTIR spectra, the reaction mixture was treated with activated charcoal to inactivate catalytic Sn. The reaction mixture was filtered off using Celite bed. The product was further purified by vacuum distillation to obtain approximately 70% pure product. The product (Structure IV) was isolated and stored at room temperature.

Structure IV

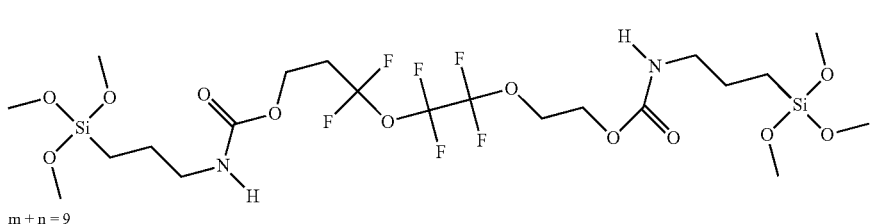

m + n = 9

Summary of Materials Used

SPUR+*1050, MTMS, Trimethoxy epoxy silane A187, Trimethoxy amino silane A1110 were procured from Momentive Performance Materials. Bis hydroxyl terminated silanol (D400) was purchased from Gelest, Inc. Hybrid silanes were synthesized as mentioned in Example 1 and 2. Table 1 provides the descriptions and the sources of different materials used in the formulation.

TABLE 1

Description and the source of materials

| Polymer A (Material)/Label** | Description | Source |
|---|---|---|
| SPUR + *1050, A1 | Alkoxy silane having urethane linkage | Momentive Performance Materials, Leverkusen, Germany |

TABLE 1-continued

| Description and the source of materials | | |
|---|---|---|
| Bis hydroxyl terminated siloxane fluid (D400), A2 | — | Gelest, Inc. |
| A3 | Structure I | In house synthesized |
| A4 | Structure II | In house synthesized |
| EXO F-87-1MS-900K (A5)* | Alkoxy Silicone | Momentive Performance Materials, Nantong, China |
| F-SP-100 (A6)* | MQ Resin in siloxane | Momentive Performance Materials, Nantong, China |
| F-88-100 (A7)* | Alkoxy Silicone | Momentive Performance Materials, Nantong, China |

| Polymer B (Material)/Label** | Description | Source |
|---|---|---|
| B1 | Structure III | In house synthesized |
| B2 | Structure IV | In house synthesized |
| MTMS, B3 | Methyl Trimethoxy silane | Momentive Performance Materials, Leverkusen, Germany |
| Silquest *A-Link 187, B4 | Trimethoxy epoxy silane | Momentive Performance Materials, USA |
| Silquest *A-Link 1110, B5 | Trimethoxy amino silane | Momentive Performance Materials, Leverkusen, Germany |
| Silquest* A-Link 597, B6 | Isocyanurate based Silane | Momentive Performance Materials, USA |
| Ethyl Silicate-28, B7 | | Momentive Performance Materials, USA |

| Filler | Description | Source |
|---|---|---|
| Nickel Coated Graphite (f1) | (a) Mesh size 100 with (b) Mesh size 200 (c) Mesh Size 300 | Chengdu Nuclear 857 New Materials Co., Ltd |
| Graphite (f 2) | Nanopowder | Sigma Aldrich, India |
| Copper (f 3) | | Sigma Aldrich, India |
| Silver (f 4) | | Sigma Aldrich, India |
| Carbon nanotube (f5) | | Qingdao Haida Haixi New Materials Co., Ltd |

**Label-is used herein for describing the formulations.
*Momentive's commercial material Preparation of Various Formulations Polymer A and optionally polymer B were used to prepare hybrid silicone composites in the presence of one or more fillers. Fillers of various weight ratios were added to the mixture of polymer A and optionally polymer B. After mixing the polymer A, the fillers, and optionally polymer B, the mixture was cured at room temperature. The details of the various formulations are described below in Table 2. For different formulations, different types of curable silicones with different functionalities, and different types of fillers were selected. Various formulations are presented in Table 2. For making the formulation, metal catalyst (Sn and Ti-based catalyst) has been used.

Physico Mechanical Property Testing Methodology

EMI Shielding Measurement: The EMI shielding measurement for the samples of different forms were done as per the IEEE299 standard while the electrical conductivity measurement: The electrical resistivity measurement for the samples of different forms were done as per the ASTM D257 standard using the four-probe instrument. The obtained electrical resistivity value was transposed to electrical conductivity. Thermal Conductivity: The thermal conductivity measurement of the samples was done following the ASTM E1530 standard. The lap shear of the developed formulations was measured using the ASTM D3163 standard. Instron instrument was used for the same. Hardness measurement:

TABLE 2

Representative examples and their composition

| | Polymer A | | Polymer B | | Filler | |
|---|---|---|---|---|---|---|
| Formulation No. | Label | Percentage in formulation | Label | Percentage in formulation | Label | Percentage in formulation |
| F1 | A1 | 30 | B | 0 | f3 | 70 |
| F2 | A2 | 74 | B3 | 4 | f2 | 22 |
| F3 | A2, A3 | 18, 10 | B5 | 2 | f1 | 70 |
| F4 | A2 | 25 | B1 | 5 | f1a, f4 | 68, 2 |
| F5 | A2, A4 | 25, 5 | B | 0 | f1a | 70 |
| F6 | A2 | 25 | B2 | 5 | f1a, f4 | 68, 2 |
| F7 | A1 | 30 | B | 0 | f4 | 70 |
| F8 | A5, A6, A7 | 34.2, 2, 1 | B3, B4, B6, B7 | 0.24, 0.44, 0.38, 0.44 | f1b, f1c, f5 | 9.9, 49.9 0.5 |

The hardness of the developed composites was measured according to ASTM D2240 standard.

TABLE 3

Property of the developed formulations

| Formulation No. | Electrical Conductivity (S/cm) | Lap Shear (MPa) | Hardness (Shore A) |
|---|---|---|---|
| F1 | 0.09 | 0.55 | 55 |
| F2 | 0.002 | 0.16 | 45 |
| F3 | 0.07 | 0.28 | 44 |
| F4 | 0.33 | 0.54 | 60 |
| F5 | 2.89 | 0.76 | 19 |
| F6 | 5.4 | 0.17 | 32 |
| F7 | 0.82 | 0.43 | 49 |
| F8 | 2.24 | 1.42 | 50 |

The EMI shielding ability of the developed formulations was also checked in the range of 6 GHz to 12 GHz. The thickness of the samples was between 0.5 mm to 1.5 mm. The EMI shielding effectiveness of the selective sample is shown in Table 4. The thermal conductivity values of the selective samples are shown in Table 5

TABLE 4

EMI Shielding Effectiveness

| Formulation No. | Shielding Effectiveness dB |
|---|---|
| F3 | 65 |
| F7 | 100 |
| F8 | 85 |

TABLE 5

Thermal Conductivity

| Formulation No. | Thermal Conductivity (w/mK) |
|---|---|
| F2 | 1.74 |
| F3 | 1.25 |
| F5 | 1.1 |
| F6 | 1.13 |

Comparative Example 1

For drawing the comparison of the hybrid silicone-based formulation to that of the pure silicone-based comparison, controlled sample (comparative to formulation F7) was made and tested.

TABLE 6

Comparative Example 1

| Formulation No. | Polymer A Label | Polymer A Percentage in formulation | Polymer B Label | Polymer B Percentage in formulation | Filler Label | Filler Percentage in formulation | Electrical Conductivity (S/cm) | Hardness (Shore A) |
|---|---|---|---|---|---|---|---|---|
| Control (C) | A2 | 30 | B | — | f4 | 70 | 0.06 | 60 |
| F7 | A1 | 30 | B | — | f4 | 70 | 0.82 | 49 |

Embodiments of the present technology have been described above and modification and alterations may occur to others upon the reading and understanding of this specification. The claims as follows are intended to include all modifications and alterations insofar as they come within the scope of the claims or the equivalent thereof.

What is claimed is:

1. A curable silicone composition, comprising:
   (i) a polymer A of Formula 1;
   (ii) a conductive filler in an amount of 5% to 80% by weight of the composition;
   (iii) a catalyst, and optionally
   (iv) a polymer B of Formula (2a) or (2a');
wherein the curable silicone composition is a condensation cure system; and the cured form of the curable composition is an electrically conductive material, $$(R)_a(W)_b(R)_{a''} \quad \text{Formula 1}$$

wherein a and a" are independently zero or greater with the proviso that $a+a''>0$ and b is 1, wherein R is represented by Formula (1a):

$$(CH_2)_c(CH_2O)_d(CHOH)_e(S)_f(X)_g \quad \text{Formula (1a)}$$

S is independently selected from a hydroxyl radical, an isocyanate radical, a primary amine, or a carboxylic radical and X is independently selected from Formula (1b)

Formula (1b)

wherein $R_1$, $R_1'$, and $R_1''$ are independently selected from an alkyl radical, an alkoxy radical, a hydroxyl radical, a hydrogen radical or from a hydrocarbon having C1-C20 carbon atoms, or fluorinated hydrocarbon having C1-C20 carbon atoms, c, d, e, f, and g are each an integer of 0 or greater with the proviso that $c+d+e+f+g>0$, W in Formula 1 is represented by Formula (1c)

$$(Y)_h(Z)_i \quad \text{Formula (1c)}$$

wherein h and i are independently zero or greater with the proviso that $h+i>0$, Y in formula (1c) is represented by Formula (1d):

$$(M_1)_{x''}(D_1)_j(D_2)_k(D^*)_l(T_1)_m(Q_1)_n(M_2)_{y''} \quad \text{Formula (1d)}$$

where in j, k, l, m, n, x", and y" are independently zero or greater with the proviso that $(j+k+l+m+n+x''+y'')>0$ wherein $M_1$ is represented by Formula (1e):

$$R_2R_3R_4SiI_{1/2} \quad \text{Formula (1e)}$$

$D_1$ is represented by Formula (1f):

$$R_5R_6SiI_{2/2} \quad \text{Formula (1f)}$$

$D_2$ is represented by Formula (1g):

$$R_7R_8SiI_{2/2} \quad \text{Formula (1g)}$$

$D^*$ is represented by Formula (1h):

Formula (1h)

$D_3$ is represented by Formula (1i):

$$R_9R_{10}SiI_{2/2} \quad \text{Formula (1i)}$$

$D_4$ is represented by Formula (1j):

$$R_{11}R_{12}SiI_{2/2} \quad \text{Formula (1j)}$$

$D_5$ is represented by Formula (1k):

$$R_{13}R_{14}SiI_{2/2} \quad \text{Formula (1k)}$$

$D_6$ is represented by Formula (1l):

$$R_{15}R_{16}SiI_{2/2} \quad \text{Formula (1l)}$$

$T_1$ is represented by Formula (1m):

$$R_{17}SiI_{3/2} \quad \text{Formula (1m)}$$

$Q_1$ is represented by Formula (1n):

$$SiI_{4/2} \quad \text{Formula (1n)}$$

$M_2$ is represented by Formula (1o):

$$R_{18}R_{19}R_{20}SiI_{1/2} \quad \text{Formula (1o)}$$

$R_2$-$R_{20}$ are independently selected from R, or a monovalent cyclic or acyclic, aliphatic or aromatic, hydrocarbon, or a fluorinated hydrocarbon having 1-20 carbon atoms or carboxylate radical or epoxy radical, wherein o and p are independently zero or greater with the proviso that o+p>0, I is O or $CH_2$ group subject to the limitation that the molecule contains an even number of $O_{1/2}$ and even number of $(CH_2)_{1/2}$, Z in Formula (1c) is represented by Formula (1p):

$$[E]_q[J]_r \quad \text{Formula (1p)}$$

wherein E is independently selected from urethane, urea, anhydride, amide, imide, hydrogen radical, or a monovalent cyclic or acyclic, aliphatic or aromatic, hydrocarbon, or a fluorinated hydrocarbon having 1-20 carbon atoms, q can be 0 or greater, and r>0, J is independently selected from Formula (1q):

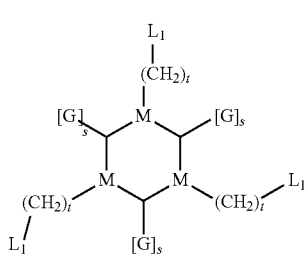

Formula (1q)

wherein M is independently selected from a carbon atom or a heteroatom,

G is a heteroatom selected from oxygen, wherein t and s are independently zero or greater with the proviso that t+s>0, L1 is independently selected from urethane, urea, anhydride, or amide, the polymer B is selected from Formula (2a) or (2a'):

Formula (2a)

wherein M' is independently selected from a carbon atom or a heteroatom,

G' is a heteroatom selected from oxygen, s' is 0 or greater, t'>0, $L_1'$ is independently selected from an isocyanate, a primary amine, or from R' represented by Formula (2b):

$$(M_3)_{y''}(D_7)_c(D_8)_d(D^{**})_e(T_2)_f(Q_2)_g(M_4)_{z'} \quad \text{Formula (2b)}$$

wherein $M_3$ is represented by Formula (2c):

$$R_{25}R_{26}R_{27}SiI'_{1/2} \quad \text{Formula (2c)}$$

$D_7$ is represented by Formula (2d)

$$R_{28}R_{29}SiI'_{2/2} \quad \text{Formula (2d)}$$

$D_8$ is represented by Formula (2e):

$$R_{30}R_{31}SiI'_{2/2} \quad \text{Formula (2e)}$$

$D^{**}$ is represented by Formula (2f):

Formula (2f)

$D_9$ is represented by Formula (2g):

$$R_{32}R_{33}SiI'_{2/2} \quad \text{Formula (2g)}$$

$D_{10}$ is represented by Formula (2h):

$$R_{34}R_{35}SiI'_{2/2} \quad \text{Formula (2h)}$$

$D_{11}$ is represented by Formula (2i):

$$R_{36}R_{37}SiI'_{2/2} \quad \text{Formula (2i)}$$

$D_{12}$ is represented by Formula (2j):

$$R_{38}R_{39}SiI'_{2/2} \quad \text{Formula (2j)}$$

$T_2$ is represented by Formula (2k):

$$R_{40}SiI'_{3/2} \quad \text{Formula (2k)}$$

$Q_2$ is represented by Formula (2l):

$$SiI'_{4/2} \quad \text{Formula (2l)}$$

$M_4$ is represented by Formula (2m):

$$R_{41}R_{42}R_{43}SiI'_{1/2} \quad \text{Formula (2m)}$$

wherein $R_{25}$-$R_{43}$ are independently selected from a hydrogen radical, a monovalent cyclic or acyclic, aliphatic or aromatic, hydrocarbon, or a fluorinated hydrocarbon having $C_1$-$C_{20}$ carbon atoms, an alkoxy radical, or a hydroxyl radical, I' is O or a $CH_2$ group subject to the limitation that the molecule contains an even number of $O_{1/2}$ and even number of $(CH_2)_{1/2}$ c', d, e', f, g', y''' and z' are independently zero or greater with the proviso that h', i'>0 when e'>0;

$L_1$' of Formula (2a) is represented by Formula (2n):

$(R')_{a'}(W')_{b'}(R')_{a''}$  Formula (2n)

wherein R' is represented by Formula (2b) above,

W' is independently selected from a hydrocarbon radical of 1-20 carbon atom, a fluorinated hydrocarbon, or a perfluroether;

a' and a'' are each 0 or greater with the proviso that a'+a''>0, and b' is 0 or greater;

$[E']_{q'}[J']_{r'}$  Formula (2a')

wherein E' is independently selected from R', isocyanate, amine, hydrogen, a monovalent cyclic or acyclic, aliphatic or aromatic, hydrocarbon, or a fluorinated hydrocarbon having C1-C20 carbon atoms, or combinations thereof, wherein q' and r' are independently zero or greater with the proviso that q'+r'>0, J' is independently selected from Formula (2b'):

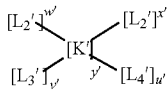

Formula (2b')

wherein $L_2'$, $L_3'$, $L_4'$ are independently selected from a $L_1'$, phthalimide radical, a fluorinated hydrocarbon, an aliphatic or aromatic hydrocarbon, a urea linkage, alkoxy, or a urethane linkage, u', v', w', and x' are each 0 or greater with the proviso that u'+v'+w'+x'>0, K is independently selected from carbon, silicon, a heteroatom, a hydrocarbon radical, or a carbonyl radical with the proviso that y'>0.

2. The curable silicone composition of claim 1, wherein polymer A comprises a silanol, a hybrid silanol, a silylated organic polymer or a hybrid siloxane.

3. The curable silicone composition of claim 1, wherein Formula (1a) is selected from a linear chain, a branched chain, or a cyclic structure.

4. The curable silicone composition of claim 1 comprising polymer B, wherein the polymer B, as represented by Formula 2a or 2a', is used as a cross-linker, or a chain extender.

5. The curable silicone composition of claim 1 comprising polymer, wherein the polymer B, as represented by Formula 2a or 2a', is selected from a linear polymer, a branched polymer, or a cyclic polymer.

6. The curable silicone composition of claim 1 comprising polymer, wherein the polymer B, as represented by Formula 2a, is a cyclic polymer.

7. The curable silicone composition of claim 6, wherein the M' is selected from heteroatoms.

8. The curable silicone composition of claim 6, wherein W' of Formula 2n is selected from a hydrocarbon radical of 1-20 carbon atom, a fluorinated hydrocarbon, or a perfluroether.

9. The curable silicone composition of claim 1, wherein the polymer A is present in a range from about 5% to 60% based on the weight of the composition.

10. The curable silicone composition of claim 1, wherein the polymer B is present in a range from about 1% to 80% based on the weight of the composition.

11. The curable silicone composition of claim 1, wherein the filler is selected from a group consisting of alumina, magnesia, ceria, hafnia, silicon, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, graphite, graphene, metal coated graphite, metal coated graphene, aluminum powder, copper powder, bronze powder, brass powder, silver, zinc oxide, carbon nanotubes, boron nitride nanosheets, zinc oxide nanotubes, black phosphorous, silver coated aluminum, silver coated glass, silver plated aluminum, nickel plated silver, nickel plated aluminum, carbon black of different structures, monel mesh and wires, or combinations of two or more thereof.

12. The curable silicone composition of claim 1, further comprising a catalyst selected from tin, titanium, zirconium, lead, iron, cobalt, antimony, manganese, bismuth and zinc compounds.

13. The curable silicone composition of claim 12, wherein the catalyst is present in a range from about 0.0001 weight % to about 0.1 weight %.

14. The curable silicone composition of claim 1, further comprising an adhesion promoter, selected from a group consisting of trialkoxy epoxy silane, a trialkoxy primary amino silane, a combination of a primary and a secondary amine containing trialkoxy silane, a tris-(trialkoxy) isocyanurate based silane, an alkylthiocarboxylated trialkoxy silane, and a combination of two or more thereof.

15. The curable silicone composition of claim 1, further comprising a diluent selected from a group consisting of glycidyl ether, a liquid hydrocarbon, a silicone fluid, and combinations thereof.

16. The curable silicone composition of claim 1, further comprising a rheology modifier, selected from a group consisting of alkanes, silanes, silicones, acrylic copolymers, glycols, polyols, ethers, esters, polyesters, alcohols, amides, polyamides, amines, polyamines, imines, polyimines, urethanes, polyurethanes, ketones, polyketones, saccharides, polysaccharides, cellulose, fluorocompounds, thermoplastic or thermosetting resins, polyvinyls, synthetic or natural oils, naturally occurring additives, guar, xanthanes, alginates, lactates, lactides, anhydrides, gums, silicates, borates, oxides, sulfides, sulfates and combinations thereof.

17. A cured material of the curable composition of claim 1.

18. The cured material of claim 17, wherein the cured material has an electromagnetic interference (EMI) shielding efficiency between 50 to 170 dB.

19. An article comprising the cured material of claim 17, wherein the article is selected from a coating, an adhesive, a sealant, an electrode, an ink, a thermally conductive material, an electrically conductive material, a sensor, an actuator, a heating pad, an antibacterial packaging material, a conductive plastic, or an EMI shielding material.

20. A method of making a silicone composition comprising:
   (i) mixing Polymer A, a conductive filler, a catalyst, and Polymer B together to form a mixture, where the catalyst is added with respect to total weight of the polymer A and polymer B, and filler;
   (ii) homogenizing the mixture of (i) to form a homogenized mixture; and
   (iii) curing the homogenized mixture by condensation curing, wherein polymer A is a silicone polymer of Formula (1) and polymer B is a silicone polymer of Formula (2a) or (2a'):

$$(R)_a(W)_b(R)_{a''} \quad \text{Formula 1};$$

wherein a and a'' are independently zero or greater with the proviso that $a+a''>0$ and b is 1,
wherein R is represented by Formula (1a):

$$(CH_2)_c(CH_2O)_d(CHOH)_e(S)_f(X)_g \quad \text{Formula (1a)}$$

S is independently selected from a hydroxyl radical, an isocyanate radical, a primary amine, or a carboxylic radical and X is independently selected from Formula (1b)

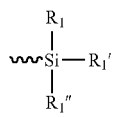

Formula (1b)

wherein $R_1$, $R_1'$, and $R_1''$ are independently selected from an alkyl radical, an alkoxy radical, a hydroxyl radical, a hydrogen radical or from a hydrocarbon having C1-C20 carbon atoms, or fluorinated hydrocarbon having C1-C20 carbon atoms, c, d, e, f, and g are each an integer of 0 or greater with the proviso that $c+d+e+f+g>0$, W in Formula 1 is represented by Formula (1c)

$$(Y)_h(Z)_i \quad \text{Formula (1c)}$$

wherein h and i are independently zero or greater with the proviso that $h+i>0$, Y in formula (1c) is represented by Formula (1d):

$$(M_1)_{x''}(D_1)_j(D_2)_k(D^*)_l(T_1)_m(Q_1)_n(M_2)_{y''} \quad \text{Formula (1d)}$$

where in j, k, l, m, n, x'', and y'' are independently zero or greater with the proviso that $(j+k+l+m+n+x''+y'')>0$,
wherein $M_1$ is represented by Formula (1e):

$$R_2R_3R_4SiI_{1/2} \quad \text{Formula (1e)}$$

$D_1$ is represented by Formula (1f):

$$R_5R_6SiI_{2/2} \quad \text{Formula (1f)}$$

$D_2$ is represented by Formula (1g):

$$R_7R_8SiI_{2/2} \quad \text{Formula (1g)}$$

$D^*$ is represented by Formula (1h):

Formula (1h)

$D_3$ is represented by Formula (1i):

$$R_9R_{10}SiI_{2/2} \quad \text{Formula (1i)}$$

$D_4$ is represented by Formula (1j):

$$R_{11}R_{12}SiI_{2/2} \quad \text{Formula (1j)}$$

$D_5$ is represented by Formula (1k):

$$R_{13}R_{14}SiI_{2/2} \quad \text{Formula (1k)}$$

$D_6$ is represented by Formula (1l):

$$R_{15}R_{16}SiI_{2/2} \quad \text{Formula (1l)}$$

$T_1$ is represented by Formula (1m):

$$R_{17}SiI_{3/2} \quad \text{Formula (1m)}$$

$Q_1$ is represented by Formula (1n):

$$SiI_{4/2} \quad \text{Formula (1n)}$$

$M_2$ is represented by Formula (1o):

$$R_{18}R_{19}R_{20}SiI_{1/2} \quad \text{Formula (1o)}$$

$R_2$-$R_{20}$ are independently selected from R, or a monovalent cyclic or acyclic, aliphatic or aromatic, hydrocarbon, or a fluorinated hydrocarbon having 1-20 carbon atoms or carboxylate radical or epoxy radical, wherein o and p are independently zero or greater with the proviso that $o+p>0$, I is O or $CH_2$ group subject to the limitation that the molecule contains an even number of $O_{1/2}$ and even number of $(CH_2)_{1/2}$, Z in Formula (1c) is represented by Formula (1p):

$$[E]_q[J]_r \quad \text{Formula (1p)}$$

wherein E is independently selected from urethane, urea, anhydride, amide, imide, hydrogen radical, or a monovalent cyclic or acyclic, aliphatic or aromatic, hydrocarbon, or a fluorinated hydrocarbon having 1-20 carbon atoms, q can be 0 or greater, and $r>0$, J is independently selected from Formula (1q) or (1q'):

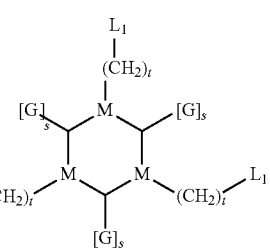

Formula (1q)

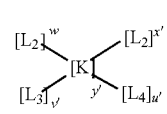

Formula (1q')

wherein M is independently selected from a carbon atom or a heteroatom,

G is a heteroatom selected from oxygen, wherein t and s are independently zero or greater with the proviso that $t+s>0$, L1 is independently selected from urethane, urea, anhydride, or amide, L2, L3, and L4 are independently selected from alkoxy, phthalimide, fluorinated hydrocarbon, hydrocarbon, aromatic hydrocarbon, u, v, w, and x are each 0 or greater, K is independently selected from carbon, silicon, heteroatom, hydrocarbon, or carbonyl radical with the proviso that $y>0$;

the polymer B is selected from Formula (2a) or (2a'):

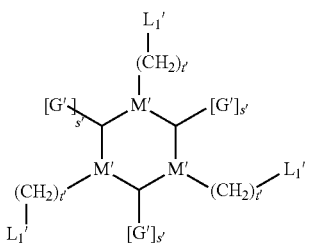
Formula (2a)

wherein M' is independently selected from a carbon atom or a heteroatom,
G' is a heteroatom selected from oxygen,
s' is 0 or greater,
t'>0,
$L_1'$ is independently selected from an isocyanate, a primary amine, or from R' represented by Formula (2b):

$(M_3)_{y''}(D_7)_{c'}(D_8)_{d'}(D^{**})_{e'}(T_2)_{f'}(Q_2)_{g'}(M_4)_{z'}$  Formula (2b)

wherein $M_3$ is represented by Formula (2c):

$R_{25}R_{26}R_{27}SiI'_{1/2}$  Formula (2c)

$D_7$ is represented by Formula (2d)

$R_{28}R_{29}SiI'_{2/2}$  Formula (2d)

$D_8$ is represented by Formula (2e):

$R_{30}R_{31}SiI'_{2/2}$  Formula (2e)

$D^{**}$ is represented by Formula (2f):

Formula (2f)

$D_9$ is represented by Formula (2g):

$R_{32}R_{33}SiI'_{2/2}$  Formula (2g)

$D_{10}$ is represented by Formula (2h):

$R_{34}R_{35}SiI'_{2/2}$  Formula (2h)

$D_{11}$ is represented by Formula (2i):

$R_{36}R_{37}SiI'_{2/2}$  Formula (2i)

$D_{12}$ is represented by Formula (2j):

$R_{38}R_{39}SiI'_{2/2}$  Formula (2j)

$T_2$ is represented by Formula (2k):

$R_{40}SiI'_{3/2}$  Formula (2k)

$Q_2$ is represented by Formula (2l):

$SiI'_{4/2}$  Formula (2l)

$M_4$ is represented by Formula (2m):

$R_{41}R_{42}R_{43}SiI'_{1/2}$  Formula (2m)

wherein $R_{25}$-$R_{43}$ are independently selected from a hydrogen radical, a monovalent cyclic or acyclic, aliphatic or aromatic hydrocarbon, or a fluorinated hydrocarbon having $C_1$-$C_{20}$ carbon atoms, an alkoxy radical, or a hydroxyl radical, I' is O or a $CH_2$ group subject to the limitation that the molecule contains an even number of $O_{1/2}$ and even number of $(CH_2)$ 1/2
c', d, e', f, g', y'' and z' are independently zero or greater with the proviso that
h', i'>0 when e'>0;
$L_1'$ of Formula (2a) is represented by Formula (2n):

$(R')_{a'}(W')_b(R')_{a''}$  Formula (2n)

wherein R' is represented by Formula (2b) above,
W' is independently selected from a hydrocarbon radical of 1-20 carbon atom, a fluorinated hydrocarbon, or a perfluroether;
a' and a'' are each 0 or greater with the proviso that a'+a'''>0, and b' is 0 or greater;

$[E']_{q'}[J']_{r'}$  Formula (2a')

wherein E' is independently selected from R', isocyanate, amine, hydrogen, a monovalent cyclic or acyclic, aliphatic or aromatic, hydrocarbon, or a fluorinated hydrocarbon having C1-C20 carbon atoms, or combinations thereof,
wherein q' and r' are independently zero or greater with the proviso that q'+r'>0,
J' is independently selected from Formula (2b'):

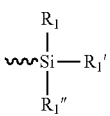
Formula (2b')

wherein $L_2'$, $L_3'$, $L_4'$ are independently selected from a $L_1'$, phthalimide radical, a fluorinated hydrocarbon, an aliphatic or aromatic hydrocarbon, a urea linkage, alkoxy, or a urethane linkage,
u', v', w', and x' are each 0 or greater with the proviso that u'+v'+w'+x'>0,
K is independently selected from carbon, silicon, a heteroatom, a hydrocarbon radical, or a carbonyl radical with the proviso that y'>0.

21. A curable silicone composition, comprising:
(i) a polymer A of Formula 1;
(ii) a conductive filler in an amount of 5% to 80% by weight of the composition;
(iii) a catalyst, and
(iv) a polymer B of Formula (2a) or (2a');
wherein the curable silicone composition is a condensation cure system; and the cured form of the curable composition is an electrically conductive material, $(R)_a(W)_b(R)_{a''}$  Formula 1 wherein a and a'' are independently zero or greater with the proviso that a+a''>0 and b is 1, wherein R is represented by Formula (1a):

$(CH_2)_c(CH_2O)_d(CHOH)_e(S)_f(X)_g$  Formula (1a)

S is independently selected from a hydroxyl radical, an isocyanate radical, a primary amine, or a carboxylic radical and X is independently selected from Formula (1b)

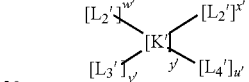
Formula (1b)

wherein $R_1$, $R_1'$, and $R_1''$ are independently selected from an alkyl radical, an alkoxy radical, a hydroxyl radical, a hydrogen radical or from a hydrocarbon having C1-C20 carbon atoms, or fluorinated hydrocarbon having C1-C20 carbon atoms, c, d, e, f, and g are each an integer of 0 or greater with the proviso that c+d+e+f+g>0, W in Formula 1 is represented by Formula (1c)

$$(Y)_h(Z)_i \quad \text{Formula (1c)}$$

wherein h and i are independently zero or greater with the proviso that h+i>0,

Y in formula (1c) is represented by Formula (1d):

$$(M_1)_{x''}(D_1)_j(D_2)_k(D^*)_l(T_1)_m(Q_1)_n(M_2)_{y''} \quad \text{Formula (1d)}$$

where in j, k, l, m, n, x'', and y'' are independently zero or greater with the proviso that (j+k+l+m+n+x''+y'')>0, wherein $M_1$ is represented by Formula (1e):

$$R_2R_3R_4SiI_{1/2} \quad \text{Formula (1e)}$$

$D_1$ is represented by Formula (1f):

$$R_5R_6SiI_{2/2} \quad \text{Formula (1f)}$$

$D_2$ is represented by Formula (1g):

$$R_7R_8SiI_{2/2} \quad \text{Formula (1g)}$$

$D^*$ is represented by Formula (1h):

Formula (1h)

$D_3$ is represented by Formula (1i):

$$R_9R_{10}SiI_{2/2} \quad \text{Formula (1i)}$$

$D_4$ is represented by Formula (1j):

$$R_{11}R_{12}SiI_{2/2} \quad \text{Formula (1j)}$$

$D_5$ is represented by Formula (1k):

$$R_{13}R_{14}SiI_{2/2} \quad \text{Formula (1k)}$$

$D_6$ is represented by Formula (1l):

$$R_{15}R_{16}SiI_{2/2} \quad \text{Formula (1l)}$$

$T_1$ is represented by Formula (1m):

$$R_{17}SiI_{3/2} \quad \text{Formula (1m)}$$

$Q_1$ is represented by Formula (1n):

$$SiI_{4/2} \quad \text{Formula (1n)}$$

$M_2$ is represented by Formula (1o):

$$R_{18}R_{19}R_{20}SiI_{1/2} \quad \text{Formula (1o)}$$

$R_2$-$R_{20}$ are independently selected from R, or a monovalent cyclic or acyclic, aliphatic or aromatic, hydrocarbon, or a fluorinated hydrocarbon having 1-20 carbon atoms or carboxylate radical or epoxy radical, wherein o and p are independently zero or greater with the proviso that o+p>0, I is O or $CH_2$ group subject to the limitation that the molecule contains an even number of $O_{1/2}$ and even number of $(CH_2)_{1/2}$, Z in Formula (1c) is represented by Formula (1p):

$$[E]_q[J]_r \quad \text{Formula (1p)}$$

wherein E is independently selected from urethane, urea, anhydride, amide, imide, hydrogen radical, or a monovalent cyclic or acyclic, aliphatic or aromatic, hydrocarbon, or a fluorinated hydrocarbon having 1-20 carbon atoms, q can be 0 or greater, and r>0, J is independently selected from Formula (1q) or (1q'):

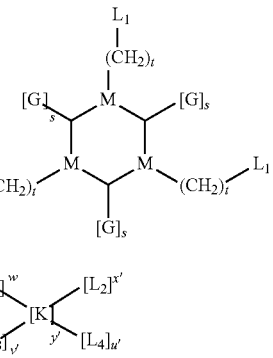

Formula (1q)

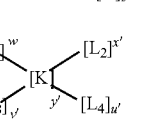

Formula (1q')

wherein M is independently selected from a carbon atom or a heteroatom,

G is a heteroatom selected from oxygen, wherein t and s are independently zero or greater with the proviso that t+s>0, L1 is independently selected from urethane, urea, anhydride, or amide, L2, L3, and L4 are independently selected from alkoxy, phthalimide, fluorinated hydrocarbon, hydrocarbon, aromatic hydrocarbon, u, v, w, and x are each 0 or greater, K is independently selected from carbon, silicon, heteroatom, hydrocarbon, or carbonyl radical with the proviso that y>0;

the polymer B is selected from Formula (2a) or (2a'):

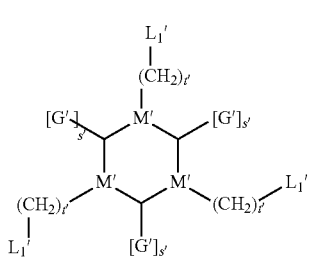

Formula (2a)

wherein M' is independently selected from a carbon atom or a heteroatom,

G' is a heteroatom selected from oxygen, s' is 0 or greater, t'>0, $L_1'$ is independently selected from an isocyanate, a primary amine, or from R' represented by Formula (2b):

$$(M_3)_{y''}(D_7)_c(D_8)_d(D^{**})_e(T_2)_f(Q_2)_g(M_4)_{z'} \quad \text{Formula (2b)}$$

wherein $M_3$ is represented by Formula (2c):

$$R_{25}R_{26}R_{27}SiI'_{1/2} \quad \text{Formula (2c)}$$

$D_7$ is represented by Formula (2d)

$$R_{28}R_{29}SiI'_{2/2} \quad \text{Formula (2d)}$$

$D_8$ is represented by Formula (2e):

$$R_{30}R_{31}SiI'_{2/2} \quad \text{Formula (2e)}$$

D** is represented by Formula (2f):

Formula (2f)

$D_9$ is represented by Formula (2g):

$R_{32}R_{33}SiI'_{2/2}$  Formula (2g)

$D_{10}$ is represented by Formula (2h):

$R_{34}R_{35}SiI'_{2/2}$  Formula (2h)

$D_{11}$ is represented by Formula (2i):

$R_{36}R_{37}SiI'_{2/2}$  Formula (2i)

$D_{12}$ is represented by Formula (2j):

$R_{38}R_{39}SiI'_{2/2}$  Formula (2j)

$T_2$ is represented by Formula (2k):

$R_{40}SiI'_{3/2}$  Formula (2k)

$Q_2$ is represented by Formula (2l):

$SiI'_{4/2}$  Formula (2l)

$M_4$ is represented by Formula (2m):

$R_{41}R_{42}R_{43}SiI'_{1/2}$  Formula (2m)

wherein $R_{25}$-$R_{43}$ are independently selected from a hydrogen radical, a monovalent cyclic or acyclic, aliphatic or aromatic, hydrocarbon, or a fluorinated hydrocarbon having $C_1$-$C_{20}$ carbon atoms, an alkoxy radical, or a hydroxyl radical, I' is O or a $CH_2$ group subject to the limitation that the molecule contains an even number of $O_{1/2}$ and even number of $(CH_2)_{1/2}$ c', d, e', f, g', y''' and z' are independently zero or greater with the proviso that (c'+d+e'+f+g'+y'''+z')>0, h', i'>0 when e'>0;

$L_1'$ of Formula (2a) is represented by Formula (2n):

$(R')_{a'}(W')_b(R')_{a'''}$  Formula (2n)

wherein R' is represented by Formula (2b) above,

W' is independently selected from a hydrocarbon radical of 1-20 carbon atom, a fluorinated hydrocarbon, or a perfluroether;

a' and a''' are each 0 or greater with the proviso that a'+a'''>0, and b' is 0 or greater;

$[E']_{q'}[J']_{r'}$  Formula (2a')

wherein E' is independently selected from R', isocyanate, amine, hydrogen, a monovalent cyclic or acyclic, aliphatic or aromatic, hydrocarbon, or a fluorinated hydrocarbon having C1-C20 carbon atoms, or combinations thereof, wherein q' and r' are independently zero or greater with the proviso that q'+r'>0, J' is independently selected from Formula (2b'):

Formula (2b')

wherein $L_2'$, $L_3'$, $L_4'$ are independently selected from a $L_1'$, phthalimide radical, a fluorinated hydrocarbon, an aliphatic or aromatic hydrocarbon, a urea linkage, alkoxy, or a urethane linkage, u', v', w', and x' are each 0 or greater with the proviso that u'+v'+w'+x'>0, K is independently selected from carbon, silicon, a heteroatom, a hydrocarbon radical, or a carbonyl radical with the proviso that y'>0.

22. A curable silicone composition, comprising:
(i) a polymer A of Formula 1;
(ii) a conductive filler in an amount of 5% to 80% by weight of the composition;
(iii) a catalyst, and
(iv) a polymer B of Formula (2a) or (2a') in a range from about 1% to 80% based on the weight of the composition;

wherein the curable silicone composition is a condensation cure system; and the cured form of the curable composition is an electrically conductive material, $(R)_a(W)_b(R)_{a''}$  Formula 1 wherein a and a'' are independently zero or greater with the proviso that a+a''>0 and b is 1, wherein R is represented by Formula (1a):

$(CH_2)_c(CH_2O)_d(CHOH)_e(S)_f(X)_g$  Formula (1a)

S is independently selected from a hydroxyl radical, an isocyanate radical, a primary amine, or a carboxylic radical and X is independently selected from Formula (1b)

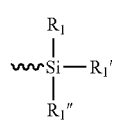

Formula (1b)

wherein $R_1$, $R_1'$, and $R_1''$ are independently selected from an alkyl radical, an alkoxy radical, a hydroxyl radical, a hydrogen radical or from a hydrocarbon having C1-C20 carbon atoms, or fluorinated hydrocarbon having C1-C20 carbon atoms, c, d, e, f, and g are each an integer of 0 or greater with the proviso that c+d+e+f+g>0, W in Formula 1 is represented by Formula (1c)

$(Y)_h(Z)_i$  Formula (1c)

wherein h and i are independently zero or greater with the proviso that h+i>0,

Y in formula (1c) is represented by Formula (1d):

$(M_1)_{x''}(D_1)_j(D_2)_k(D^*)_l(T_1)_m(Q_1)_n(M_2)_{y''}$  Formula (1d)

where in j, k, l, m, n, x'', and y'' are independently zero or greater with the proviso that (j+k+l+m+n+x''+y'')>0.

* * * * *